(12) United States Patent
Mochizuki et al.

(10) Patent No.: US 6,920,039 B2
(45) Date of Patent: Jul. 19, 2005

(54) FOLDABLE KEYBOARD

(75) Inventors: Isao Mochizuki, Gifu-ken (JP); Takeyuki Takagi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/600,506

(22) Filed: Jun. 23, 2003

(65) Prior Publication Data

US 2004/0004809 A1 Jan. 8, 2004

(30) Foreign Application Priority Data

Jun. 25, 2002 (JP) ........................................ 2002-184172
Jun. 25, 2002 (JP) ........................................ 2002-184182

(51) Int. Cl.[7] .............................................. G06F 1/16
(52) U.S. Cl. ........................ 361/680; 400/82; 400/682; 341/22; 312/223.2
(58) Field of Search ................................. 361/680, 681, 361/683; 400/82, 682, 691, 692, 693, 488, 489; 341/22; 345/168, 169; 312/223.1, 223.2, 223.3

(56) References Cited

U.S. PATENT DOCUMENTS 5,659,307 A * 8/1997 Karidis et al. ................. 341/22
5,926,364 A * 7/1999 Karidis ........................ 361/681
6,331,850 B1 * 12/2001 Olodort et al. ............. 345/168
6,353,529 B1 * 3/2002 Cies ........................... 361/681
6,532,147 B1 * 3/2003 Christ, Jr. ................... 361/683
6,636,419 B2 * 10/2003 Duarte ....................... 361/680
6,734,809 B1 * 5/2004 Olodort et al. .............. 341/22
6,755,581 B1 * 6/2004 Huang et al. ............... 400/472
2003/0002900 A1 * 1/2003 Lin ............................ 400/472
2003/0048595 A1 * 3/2003 Hsieh et al. ................ 361/680
2003/0122690 A1 * 7/2003 Hsu ........................... 341/22

FOREIGN PATENT DOCUMENTS

JP          A 8-190834          7/1996

* cited by examiner

Primary Examiner—Lynn Feild
Assistant Examiner—Anthony Q. Edwards
(74) Attorney, Agent, or Firm—Oliff & Berridge, PLLC

(57) ABSTRACT

A foldable keyboard includes first, second, and third keyboard units U1, U2, and U3 which are rotatably connected with one another by means of main links (4) and (5) disposed on side end surfaces of each unit. The first and second units U1 and U2 are rotatably connected by means of an auxiliary link (6) parallel to the main link (4), and the second and third units U2 and U3 are rotatably connected by means of an auxiliary link (7) parallel to the main link (4). The first unit U1 is formed with recesses (38) at four corners of a peripheral wall member (12) and the second unit U2 is formed with projections (36) at four corners of an undersurface of the second unit U2 so that the projections (36) are received in the recesses (38) when the first, second, and third units U1, U2, and U3 are disposed (stacked) one upon another into a folded state.

13 Claims, 7 Drawing Sheets

FOLDABLE KEYBOARD

BACKGROUND

The present invention relates to a foldable keyboard which is excellent in portability and easy to operate during use and, more particularly, to a foldable keyboard capable of bringing three keyboard units from a folded state into a horizontally aligned state, and vice versa, by a simple one-touch operation, and capable of positioning the keyboard units in a folded state that prevents release of the folded state of the units during carrying, thus improving the portability thereof.

Heretofore, various types of foldable keyboards have been proposed. Such keyboards are generally constructed so that a plurality of keyboard units are arranged one above another in a folded state during non-use and, alternatively, are aligned in a horizontal state during use.

For example, Japanese unexamined patent publication No. Hei 8-190834 discloses a folding keyboard constructed of three keyboard blocks A1, A2, and A3, the keyboard blocks A1 and A2 being mutually connected by means of a link B1 and the keyboard blocks A2 and A3 being mutually connected by means of a link B2.

In this keyboard, the three keyboard blocks A1–A3 can be folded during non-use by action of the links B1 and B2, and the keyboard blocks A1–A3 can be aligned in a horizontal state during use, similarly, by action of the links B1 and B2. The keyboard when folded can be reduced in area to one half or one third the area of the entire keyboard (unfolded). Thus, the size of the keyboard can be reduced in conformity to a downsized computer main unit or the like.

However, the folding keyboard disclosed in Japanese unexamined patent publication needs the following steps to unfold the keyboard blocks A1–A3 into a horizontally aligned state during use; at first, the blocks A1 and A2 are rotated (unfolded) with respect to the lowermost block A3 while allowing a support shaft of the link B2 to slide in a slit C2 of the block A2, and then the block A1 is rotated (unfolded) with respect to the lower block A1 while allowing a support shaft of the link B1 to slide in a slit C1 of the block A1.

In this way, each of keyboard blocks A2 and A1 requires rotating and sliding motions in order to fold or unfold the keyboard. Such unfolding work has a drawback in that it cannot be performed by a one-touch operation.

The folding keyboard disclosed in the above Japanese unexamined patent publication No. Hei 8-190834 can achieve downsizing of the keyboard itself; however, this keyboard does not securely position the keyboard blocks A1–A3 and therefore the folded blocks A1–A3 may be loosened during carrying. This may lose one half its effectiveness of attempting improvement of portability by constructing the blocks A1–A3 as foldable.

SUMMARY OF THE INVENTION

The present invention has been made in view of the above circumstances and has an object to overcome the above problems and to provide a foldable keyboard capable of bringing three keyboard units from a folded state into a horizontally aligned state, and vice versa, by a simple one-touch operation.

Another object of the present invention is to provide a foldable keyboard capable of positioning the keyboard units in a folded state that prevents unfolding of the folded units during carrying, thus improving its portability.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a foldable keyboard including first, second, and third keyboard units which are connected with one another, the units being horizontally aligned in this order during use of the keyboard and disposed one above another during nonuse, wherein the keyboard further includes a main link for connecting the first, second, and third keyboard units on a side of each unit; one end of the main link is rotatably connected with the first keyboard unit, a midpoint of the main link is rotatably connected with the second keyboard unit, and the other end of the main link is rotatably connected with the third keyboard unit.

In the foldable keyboard constructed as above, on a side of each of the first through third keyboard units, one end of the main link is rotatably connected with the first keyboard unit and the other end is rotatably connected with the third keyboard unit, and further the midpoint of the main link is rotatably connected with the second keyboard unit. Accordingly, the second and third keyboard units can be rotated at the same time with respect to the first keyboard unit, which allows the keyboard to be folded during non-use or unfolded during use by a simple one-touch operation, namely, by a rotating operation.

Herein, the above foldable keyboard may be arranged to further include a first auxiliary link which has a length one-half that of the main link and constitutes a parallel link to the main link, the first auxiliary link being rotatably connected with the first and second keyboard units respectively, and a second auxiliary link which has a length one-half that of the main link and constitutes a parallel link to the main link, the second auxiliary link being rotatably connected with the second and third keyboard units respectively.

In the above structure, the first auxiliary link parallel to the main link rotatably connects the first and second keyboard units and the second auxiliary link parallel to the main link rotatably connects the second and third keyboard units. Accordingly, it is possible to rotate the second and third keyboard units with respect to the first keyboard unit while holding the second and third units in a horizontal state parallel to the first keyboard unit. This makes it possible to stably perform the rotating operation of the second and third keyboard units.

According to another aspect of the present invention, there is provided a foldable keyboard including first, second, and third keyboard units which are connected with one another, the units being aligned during use of the keyboard and disposed one above another in the above order from below during non-use, wherein the keyboard farther includes a recess formed on an upper surface of the first keyboard unit, and a projection formed on an under surface of the second keyboard unit, the projection of the second keyboard unit being engaged in the recess of the first keyboard unit when the second keyboard unit is disposed on the first keyboard unit during non-use of the keyboard.

In the foldable keyboard constructed as above, the projection formed on the under surface of the second keyboard unit is engaged in the recess formed on the upper surface of the first keyboard unit when the first through third keyboard units are disposed one above another into a folded state. Accordingly, the second keyboard unit can be directly positioned in place with respect to the first keyboard unit and also the third keyboard unit indirectly can be positioned in place in conjunction with the second keyboard unit. Consequently, the thickness of the entire keyboard in a folded state can be maintained constant, thus improving its portability.

The above foldable keyboard may be adapted such that the keyboard further includes a cover board which has a predetermined thickness and is disposed under the first keyboard unit and the projection of the second keyboard unit has a thickness equal to the predetermined thickness of the cover board so that the first and second keyboard units are held in a horizontally flush state with respect to each other during use of the keyboard, or, such that the keyboard further includes a projection which is formed on an under surface of the third keyboard unit and has a thickness equal to the predetermined thickness of the cover board so that the third keyboard unit is held in a horizontally flush state with respect to the first and second keyboard units during use of the keyboard.

In the foldable keyboard constructed as above, the thickness of the projection formed on the under surface of the second keyboard unit is equal to the thickness of the cover board disposed under the first keyboard unit and the projection formed on the under surface of the third keyboard unit is also equal to the thickness of the cover board, so that the first through third keyboard units can be aligned horizontally during use of the keyboard, which makes it possible to make the upper surfaces of the keyboard units flush with one another. Thus, the operationality of the keyboard can be enhanced.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 2A is an explanatory view showing the keyboard in a usable state, disposed on a using place, FIG. 2B is an explanatory view showing a side view of the keyboard in the usable state, and FIG. 2C is an explanatory view showing that the second and third keyboard units are slightly folded from the usable state;

FIG. 3A is an explanatory view showing the keyboard being further folded from the state shown in FIG. 2C, FIG. 3B is an explanatory view showing the keyboard in a nearly-folded state; and FIG. 3C is an explanatory view showing the keyboard in a completely-folded state.

DETAILED DESCRIPTION OF THE PREFERRED EMBODIMENTS

A detailed description of a preferred embodiment of a foldable keyboard embodying the present invention will now be given referring to the accompanying drawings. First, a schematic structure of the keyboard in the present embodiment is explained with reference to FIG. 1, which is an exploded perspective view schematically showing the foldable keyboard.

Figure 1:
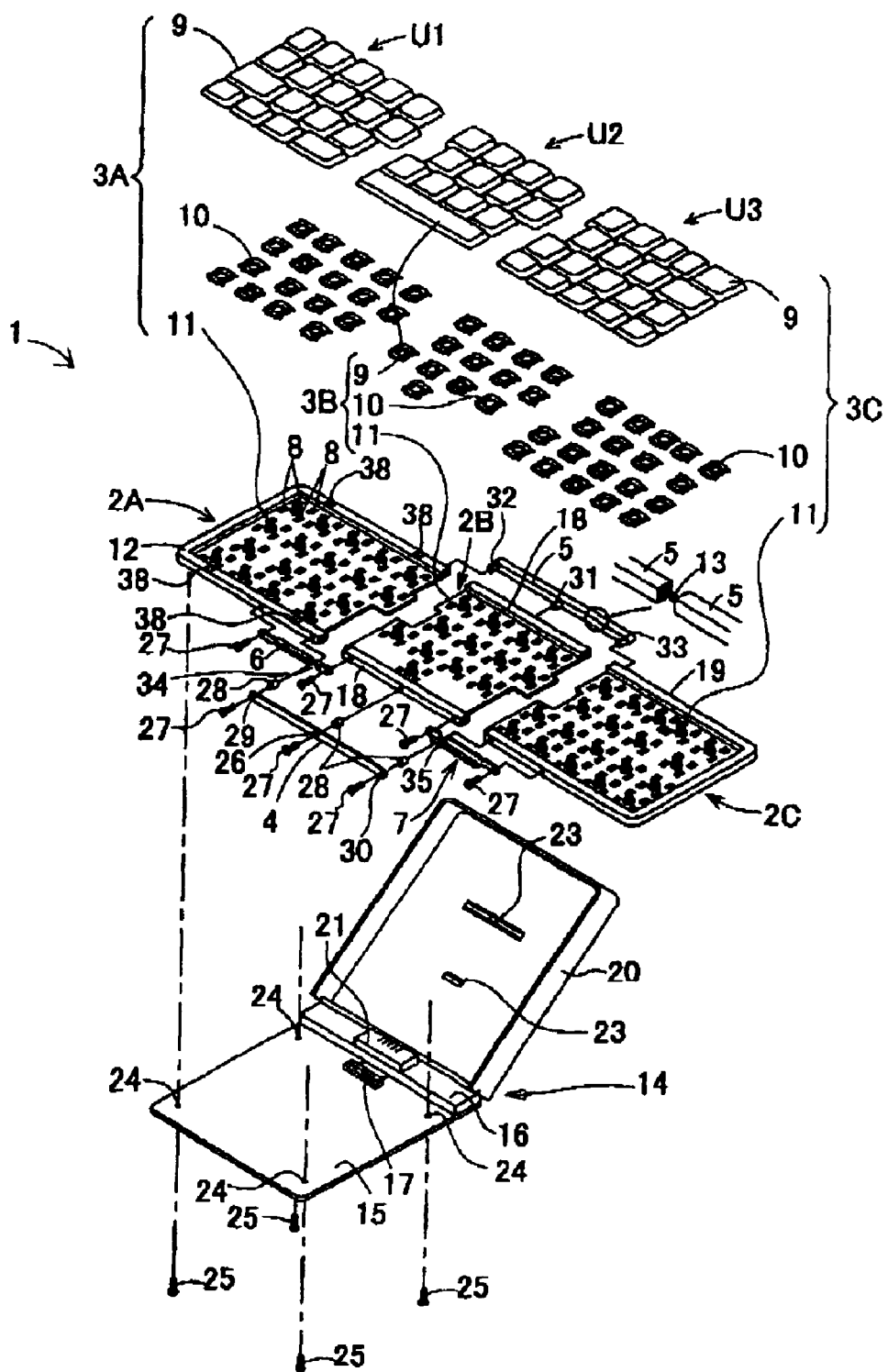
FIG. 1 is an exploded perspective view schematically showing a foldable keyboard in an embodiment of the present invention.

In FIG. 1, a keyboard 1 is constructed of first, second, and third keyboard units U1, U2, and U3, respectively. The first keyboard unit U1 includes a first support plate 2A and a plurality of key switches 3A arranged on the first support plate 2A. The second keyboard unit U2 includes a second support plate 2B and a plurality of key switches 3B arranged on the second support plate 2B. The third keyboard unit U3 includes a third support plate 2C and a plurality of key switches 3C arranged on the third support plate 2C.

It is to be noted that the first through third keyboard units U1–U3 are rotatably connected with one another by means of a pair of main links 4 and 5 disposed on opposing sides of each unit. The first and second keyboard units U1 and U2 are rotatably connected by means of an auxiliary link 6 disposed on one side (on the front side in FIG. 1) of the units. The second and third keyboard units U2 and U3 are rotatably connected by means of an auxiliary link 7 disposed on one side (on the front side in FIG. 1) of the units. The connecting structure using those main links 4 and 5 and the auxiliary links 6 and 7 will be mentioned later.

The first support plate 2A of the first keyboard unit U1 is made of a metal thin plate such as aluminum or the like, on which a predetermined number of key switches 3A which will be operated with mainly the left hand of a user are arranged.

The first support plate 2A is integrally formed with support parts 8 by press working or other manners so that four support parts 8 are provided at positions corresponding to one key switch 3A. On the first support plate 2A, there is disposed a membrane switch (not shown) having a three-layer structure including an upper sheet with a movable electrode, a lower sheet with a fixed electrode, and a spacer sheet interposed between the upper and lower sheets and formed with a switching hole, whereby the movable electrode and the fixed electrode are spaced from each other. It is to be noted that each support part 8 is formed protruding upward through a hole formed in the membrane switch.

Each key switch 3A is basically constructed of a key top 9, a pair of link members 10 for guiding a vertical movement of the key top 9, and a rubber spring 11 disposed on the membrane switch at a position corresponding to a switching part (the movable electrode and the fixed electrode) of the membrane switch. Each upper end of the pair of link members 10 is pivotally connected with the key top 9 at the under surface thereof while each lower end of same is slidably engaged in the support part 8. During non-depression, the key top 9 is urged upward by the urging force of the rubber spring 11 and held at a non-depression position (i.e., the uppermost position). When the key top 9 is depressed against the urging force of the rubber spring 11, the rubber spring 11 is caused to press the movable electrode of the membrane switch against the fixed electrode in the switching hole of the spacer, thereby performing a predetermined switching operation. The above key switch 3A and first support plate 2A constitute the first keyboard unit U1. It is to be noted that the structure of the key switch 3A is well known and hence the detailed explanation thereof is omitted herein.

The first support plate 2A is provided with a peripheral wall member 12 formed surrounding the plate 2A except for a side part thereof to be jointed with the second keyboard unit U2. This peripheral wall member 12 is of a hollow shape. This peripheral wall member 12 encloses, in the hollow, a first signal wire (not shown) connected with the membrane switch for each key switch 3A on the first support plate 2A. This first signal wire is put together with a third signal wire 13 connected with the membrane switch for each key switch 3C disposed on the third support plate 2C of the third keyboard unit U3, the signal wire 13 being extended passing through the insides of a hollow peripheral wall member 19 and a hollow main link 5 in this order into the peripheral wall member 12 and the first signal wire is also put together with a second signal wire (not shown) connected with the membrane switch for each key switch 3B disposed on the second support plate 2B of the second keyboard unit U2 and extended passing through the inside of the main link 5 into the peripheral wall member 12. The above first through third signal wires are connected with a connector (not shown) at the bottom of the first keyboard unit U1. This connector is connectable with a connector 17 provided extending from a control part 16 of the keyboard 1 and disposed on a bottom cover board 15 of a keyboard case 14.

As with the first support plate 2A, the second support plate 2B of the second keyboard unit U2 is made of a thin metal plate such as aluminum or the like. On the second support plate 2B, there are disposed a predetermined number of key switches 3B which will be operated with the right and left hands of the user. It is to be noted that the key switch 3B has the same construction as the above key switch 3A and hence the elements constituting the key switch 3B are explained with the same reference numerals as those of the key switch 3A.

The second support plate 2B is integrally formed with support parts 8 by press working or other manners so that four support parts 8 are provided at positions corresponding to one key switch 3B. On the second support plate 2B, there is disposed a membrane switch (not shown) having a three-layer structure including an upper sheet with a movable electrode, a lower sheet with a fixed electrode, and a spacer sheet interposed between the upper and lower sheets and formed with a switching hole, whereby the movable electrode and the fixed electrode are spaced from each other. It is to be noted that each support part 8 is formed protruding upward through a hole formed in the membrane switch Each key switch 3B is basically constructed of a key lop 9, a pair of link member 10 for guiding a vertical movement of the key top 9, and a rubber spring 11 disposed on the membrane switch at a position corresponding to a switching part (the movable electrode and the fixed electrode) of the membrane switch. Each upper end of the pair of link members 10 is pivotally connected with the key top 9 at the under surface thereof while each lower end of same is slidably engaged in the support part 8. During non-depression, the key top 9 is urged upward by the urging force of the rubber spring 11 and held at a non-depression position (i.e., the uppermost position). When the key top 9 is depressed against the urging force of the rubber spring 11, the rubber spring 11 is caused to press the movable electrode of the movable electrode of the membrane switch against the fixed electrode in the switching hole of the spacer, thereby performing a predetermined switching operation. The above key switch 3B and the second support plate 2B constitute the second keyboard unit U2.

The second support plate 2B is provided with a peripheral wall member 18 formed surrounding the plate 2B except for side parts thereof to be jointed with the first and third keyboard units U1 and U3 respectively.

As with the first and second support plates 2A and 2B, the third support plate 2C of the third keyboard unit U3 is made of a thin metal plate such as aluminum or the like. On the third support plate 2C, there are disposed a predetermined number of key switches 3C which will be operated mainly with the right hand of the user. It is to be noted that each key switch 3C has the same construction as the above key switch 3A and hence the elements constituting each key switch 3C are explained with the same reference numerals as those of the key switch 3A.

The third support plate 2C is integrally formed with support parts 8 by press working or other manners so that four support parts 8 are provided at positions corresponding to one key switch 3C. On the third support plate 2C, there is disposed a membrane switch (not shown) having a three-layer structure including an upper sheet with a movable electrode, a lower sheet with a fixed electrode, and a spacer sheet interposed between the upper and lower sheets and formed with a switching hole, whereby the movable electrode and the fixed electrode are spaced from each other. It is to be noted that each support part 8 is formed protruding upward through a hole formed in the membrane switch.

Each key switch 3C is basically constructed of a key top 9, a pair of link member 10 for guiding a vertical movement of the key top 9, and a rubber spring 11 disposed on the membrane switch at a position corresponding to a switching part (the movable electrode and the fixed electrode) of the membrane switch. Each upper end of the pair of link members 10 is pivotally connected with the key top 9 at the under surface thereof while each lower end of same is slidably engaged in the support part 8. During non-depression, the key top 9 is urged upward by the urging force of the rubber spring 11 and held at a non-depression position (i.e., the uppermost position). When the key top 9 is depressed against the urging force of the rubber spring 11 , the rubber spring 11 is caused to press the movable electrode of the membrane switch against the fixed electrode in the switching hole of the spacer, thereby performing a predetermined switching operation. The above key switch 3C and the third support plate 2C constitute the third keyboard unit U3. It is to be noted that the structure of the key switch 3C is well known and the detailed explanation thereof is omitted herein.

The third support plate 2C is provided with a peripheral wall member 19 formed surrounding the plate 2C except for a side part thereof to be jointed with the second keyboard unit U2. This peripheral wall member 19 encloses the (third) signal wire 13 connected with the membrane switch for each key switch 3C on the third support plate 2C of the third keyboard unit U3. The signal wire 13 is thus directed, passing through the hollow main link 5, into the peripheral wall member 12 of the first keyboard unit U1.

Next explanation is made on mounting the first keyboard unit U1 on the bottom cover board 15 of the keyboard case 14 and connecting the first, second, and third keyboard units U1, U2, and U3 with one another by means of the auxiliary links 6 and 7.

First, the structure of the keyboard case 14 is described below. This keyboard case 14 includes a box-shaped upper cover 20 which is rotatably supported with respect to the bottom cover board 15. On the bottom cover board 15, the control part 16 for control of the keyboard 1 is disposed near a rotational joint of the upper cover 20. This control part 16 is provided with a connector 21 for connecting the keyboard 1 with a personal digital assistance (PDA) or other portable electronic devices. A connector 17 is provided extending from the control part 16 and connected with the signal wires extending from the first through third keyboard units U1–U3. This connector 17 is to be connected with the connector provided on the underside of the first keyboard unit U1. The upper cover 20 is formed with two holes 23 in which ends of a support member 22 (see FIG. 5) for supporting the upper cover 20 at a slant are engaged.

The first keyboard unit U1 is mounted on the bottom cover board 15 of the keyboard case 14. More specifically, the support plate 2A of the unit U1 is fastened to the board 15 with screws 25 inserted in screw holes 24 formed at four corners of the board 15.

The connecting structure is explained below. The main link 4 is formed at its midpoint with a screw hole 26 through which a screw 27 passes and is threaded into the peripheral wall member 18 positioned at the front of the second keyboard unit U2 with a hollow spacing member 28 being interposed between the link 4 and the peripheral wall member 18, so that the main link 4 is rotatably connected with the second keyboard unit U2. This spacing member 28 serves to keep the main link 4 and the peripheral wall member 18 spaced by a fixed distance. The main link 4 is formed at an end (a left end in FIG. 1) with a screw hole 29 through which a screw 27 passes and is threaded into the peripheral wall member 12 positioned at the front of the first keyboard unit U1 with the spacing member 28 being interposed between the link 4 and the peripheral wall member 12, so that the main link 4 is rotatably connected with the first keyboard unit U1. Furthermore, the main link 4 is formed at the other end (a right end in FIG. 1) with a screw hole 30 through which another screw 27 passes and is tightened into the peripheral wall member 19 at the front of the third keyboard unit U3 with another spacing member 28 being interposed between the link 4 and the peripheral wall member 19, so that the main link 4 is rotatably connected with the third keyboard unit U3.

The hollow main link 5 is formed at the midpoint with a hollow rotatably supporting pact 31 which is rotatably received in a support hole (not shown) formed in the peripheral wall member 18 positioned at the back of the second keyboard unit U2. The rotatable support part 31 encloses the signal wire which is connected with a membrane switch for each key switch 3B of the second keyboard unit U2. The main link 5 is formed at one end (a left end in FIG. 1) with a hollow rotatable support part 32 which is rotatably received in a support hole (not shown) formed in the peripheral wall member 12 positioned at the back of the first keyboard unit U1. The main link 5 is further formed at the other end with a hollow rotatable support part 33 which is rotatably received in a support hole (not shown) formed in the peripheral wall member 19 positioned at the back of the third keyboard unit U3. The rotatable support part 33 encloses the signal wire 13 connected with a membrane switch for each key switch 3C of the third keyboard unit U3.

The main links 4 and 5 have lengths identical to each other. The screw hole 26 of the main link 4 and the rotatable support part 31 of the main link 5 are disposed at corresponding positions at the front and back of the second keyboard unit U2. The screw hole 29 of the main link 4 and the rotatable support part 32 of the main link 5 are disposed at corresponding positions at the front and back of the first keyboard unit U1. In addition, the screw hole 30 of the main link 4 and the rotatable support part 33 of the main link 5 are disposed at corresponding positions at the front and back of the third keyboard unit U3. Accordingly, the links 4 and 5 can be rotated in synchronization with each other.

The following explanation is made on the connecting structure by means of the auxiliary links 6 and 7. Each of these auxiliary links 6 and 7 has a length one-half that of the main link 4 (5) and constitutes a parallel link to the main link 4.

An end (a left end in FIG. 1) of the auxiliary link 6 is rotatably connected with the peripheral wall member 12 positioned at the front of the first keyboard unit U1 by means of a screw 27, and the other end (a right end in FIG. 1) of same is rotatably connected with the peripheral wall member 18 at the front of the second keyboard unit U2 by means of another screw 27. Similarly, an end (a left end in FIG. 1) of the auxiliary link 7 is rotatably connected with the peripheral wall member 18 positioned at the front of the second keyboard unit U2 by means of a screw 27, and the other end (a right end in FIG. 1) of same is rotatably connected with the peripheral wall member 19 at the front of the third keyboard unit U3 by means of another screw 27.

In the above connecting structure, since it is impossible to rotate the main link 4 and each auxiliary link 6 and 7 on the same plane, the spacing members 28 are disposed between the main link 4 and the peripheral wall members 12, 18, and 19 respectively positioned at the front of the keyboard units U1–U3, placing the main link 4 at the outermost position with respect to the units so that the auxiliary links 6 and 7 are positioned between the main link 4 and the peripheral wall members 12, 18, and 19. At this time, if the first through third keyboard units U1–U3 are aligned in a horizontal state, the screws 27 will interfere with the auxiliary links 6 and 7. To prevent such problem, the auxiliary link 6 in the present embodiment is formed with a guide recess 34 (see FIGS. 2C, 3A, and 3B) which is downwardly opened to receive the screw 27 tightened in the screw hole 29 of the main link 4, and the auxiliary link 7 is formed with a guide recess 35 (see FIGS. 2C, 3A, and 3B) which is upwardly opened to receive the screw 27 tightened in the screw hole 30 of the main link 4.

Figure 2A:
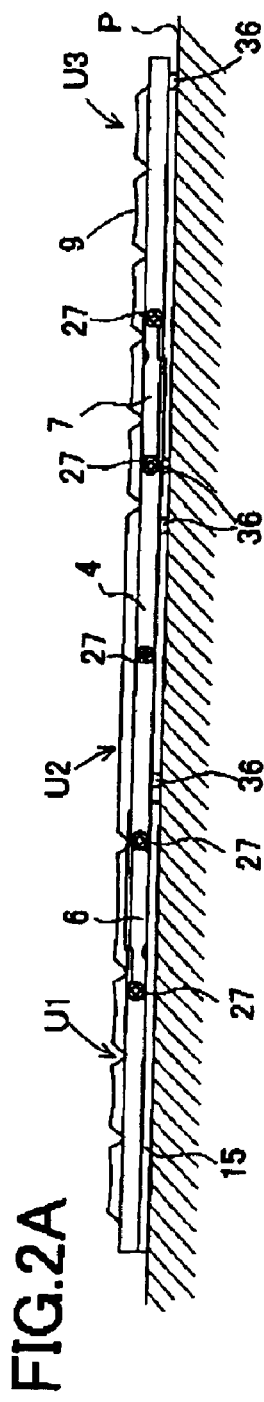
FIGS. 2A through 2C are explanatory views schematically showing the keyboard of which first through third keyboard units are gradually folded from a usable state; specifically.
Figure 2B:
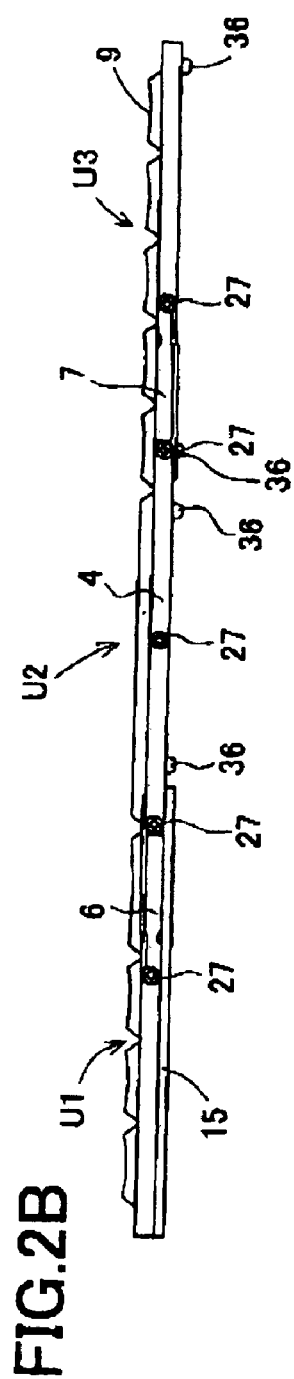
Figure 2C:
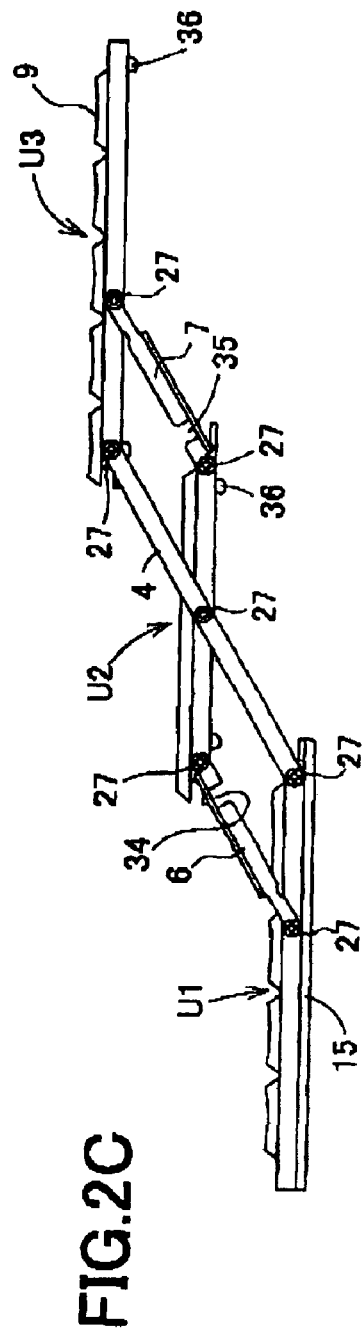
Figure 3A:
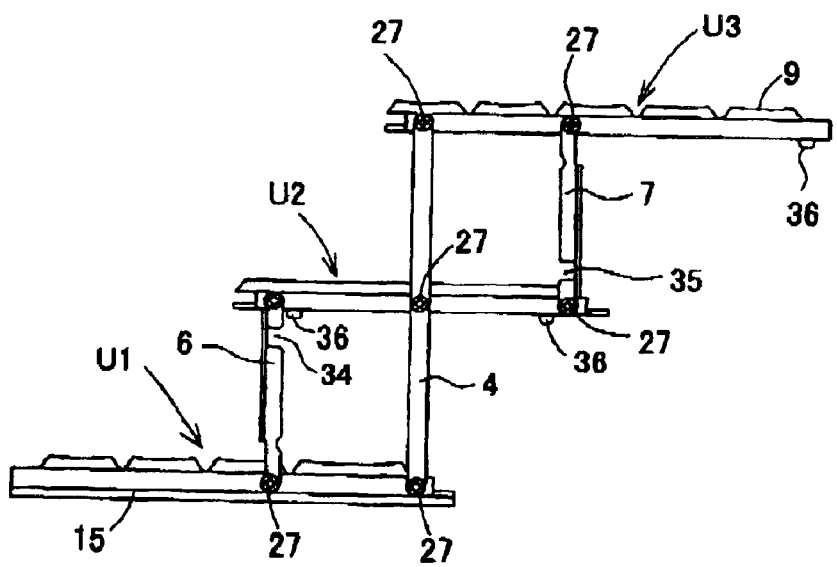
FIGS. 3A through 3C are explanatory views schematically showing the keyboard of which the second and third keyboard units are in the process of being further folded; specifically.
Figure 3B:
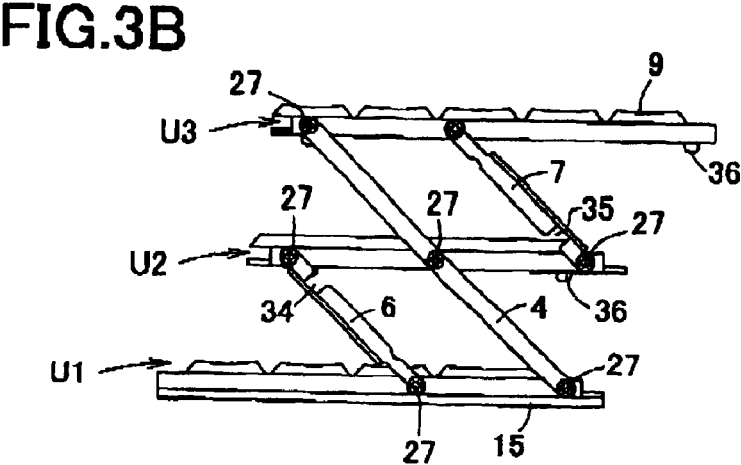
Figure 3C:
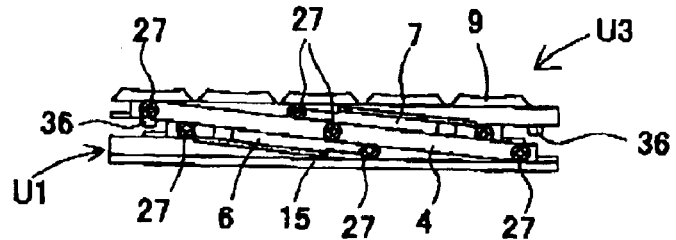
Figure 4:
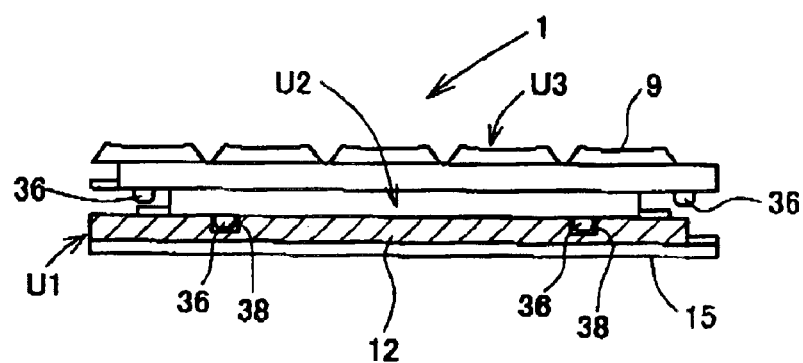
FIG. 4 is an explanatory view including a partially sectional view, schematically showing a part of the first through third keyboard units in a folded state.

Next, explanations are made on a structure of holding the first, second, and third keyboard units U1–U3 in a horizontal or flush state after horizontally aligned, and a structure of positioning the units U1–U3 after folded, referring to FIG. 2 through FIG. 4. FIGS. 2A, 2B, and 2C are explanatory views schematically showing the keyboard 1 which is gradually being folded from a usable state; specifically, FIG. 2A is an explanatory view showing the keyboard 1 in the usable state when set on a using place, FIG. 2B is an explanatory view showing a side view of the keyboard 1 in the usable state, and FIG. 2C is an explanatory view showing that the second and third keyboard units U2 and U3 are slightly folded from the usable state.

FIGS. 3A, 3B, and 3C are explanatory views schematically showing the keyboard 1 of which the second and third keyboard units U2 and U3 are in the process of being further folded; specifically, FIG. 3A is an explanatory view showing the keyboard 1 being further folded from the state shown in FIG. 2C, FIG. 3B is an explanatory view showing the keyboard 1 in a nearly-folded state; and FIG. 3C is an explanatory view showing the keyboard 1 in a completely-folded state. FIG. 4 is an explanatory view including a partially sectional view, schematically showing a part of the first through third keyboard units U1–U3 in a folded state.

In FIGS. 2A and 2B, the first keyboard unit U1, when mounted on the bottom cover board 15 of the keyboard case 14, is increased in height by the thickness of the bottom cover board 15 as compared with the second and third keyboard units U2 and U3. Accordingly, the second and third keyboard units U2 and U3 are formed at respective four corners with projections 36 having heights (thickness) equal to the thickness of the bottom cover board 15 in order to compensate for the thickness of the board 15, thereby arranging the key tops 9 of the keyboard units U1–U3 at the same height. Accordingly, the key tops 9 of the key switches 3A, 3B, and 3C of the keyboard units U1, U2, and U3 are flush with one another when the keyboard 1 is set on the using place P. This makes it possible to improve the key operability of the keyboard 1.

Figure 5:
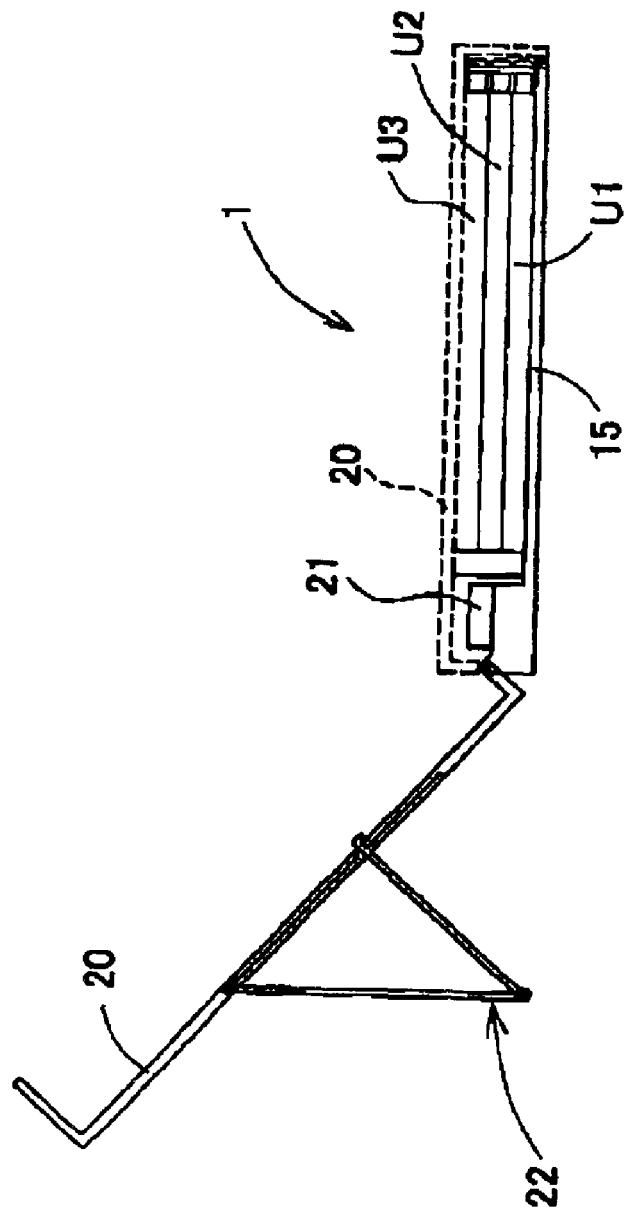
FIG. 5 is a side view showing a state where an upper cover is opened up and supported at a slant with the use of a support member while the first through third keyboard units are in a folded state.
Figure 6:
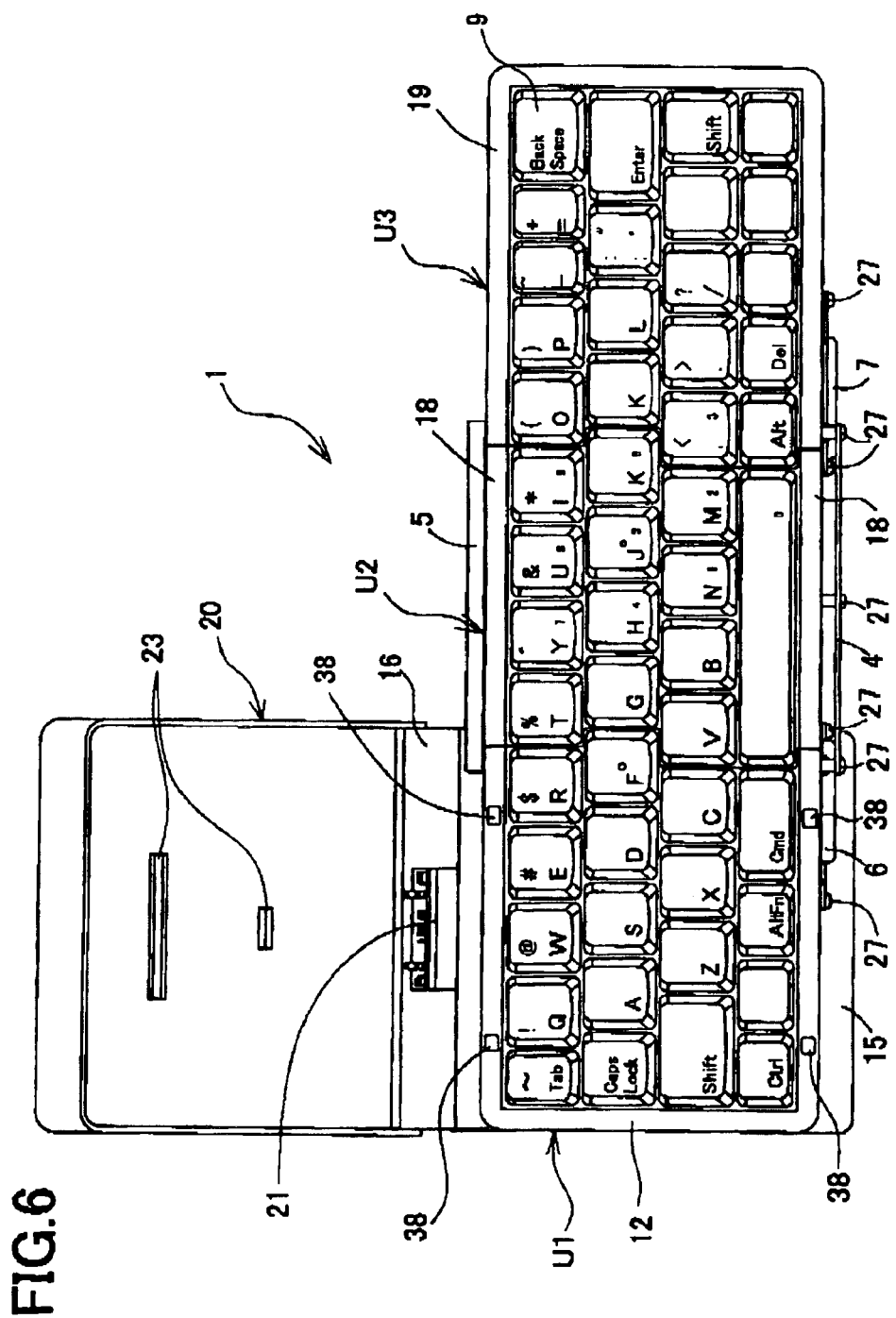
FIG. 6 is a plan view of the keyboard in a usable state after unfolded from the state shown in FIG. 5.
Figure 7:
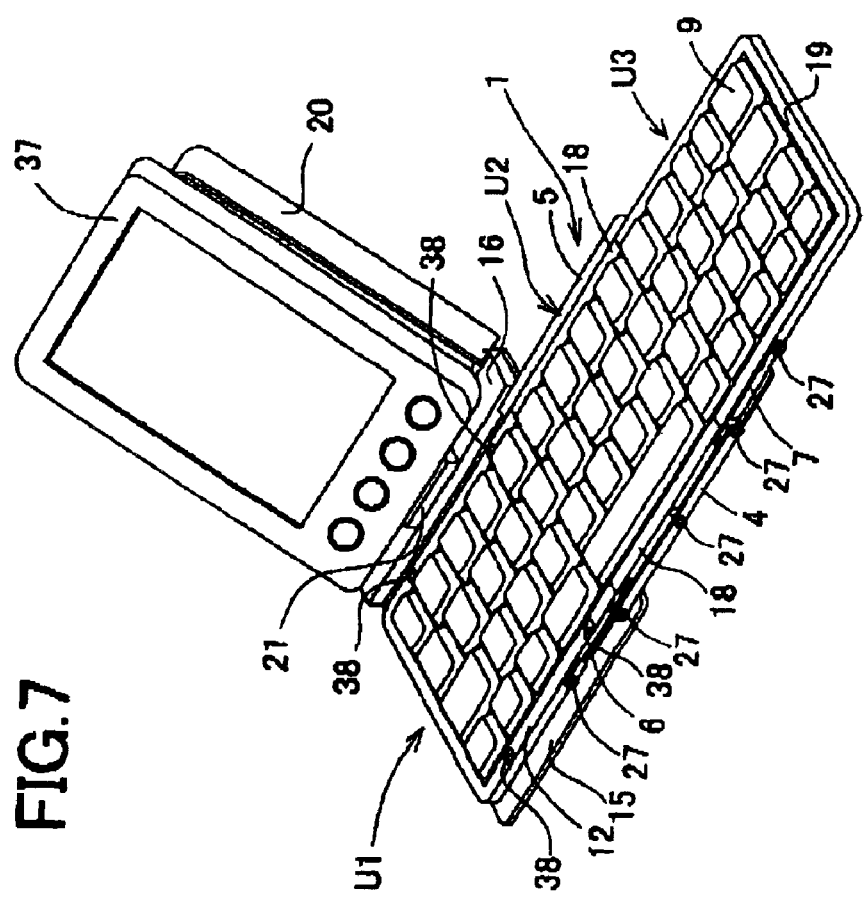
FIG. 7 is a perspective view of the keyboard and a PDA connected with a connector and mounted on the upper cover.

The case of using the keyboard 1 with the keyboard units U1–U3 being aligned in a horizontal state as above is explained below with reference to FIGS. 5, 6, and 7. FIG. 5 is a side view showing a state where the upper cover 20 is opened up and supported at a slant with the use of the support member 22 while the keyboard 1 is in a folded state. FIG. 6 is a plane view of the keyboard 1 in a usable state after unfolded from the state shown in FIG. 5. FIG. 7 is a perspective view of the keyboard 1 and a personal digital assistance (PDA) 37 connected with the connector 21 and mounted on the upper cover 20.

First, the upper cover 20 of the keyboard case 14 is rotated to open upward. At this time, both ends of the support member 22 are engaged in the two holes 23 of the upper cover 20 as seen in FIG. 5, so that the upper cover 20 is supported at a slant by means of the support member 22 held in a nearly V-shaped state in a side view. Then, when the keyboard units U1–U3 in the folded state are unfolded into a horizontally aligned state, the keyboard 1 is brought into a usable state as shown in FIG. 6.

In this state, the PDA 37 is mounted on the upper cover 20 by connecting the connector of the PDA 37 with the connector 21 provided on the bottom cover board 15. Thus, the PDA 37 is supported as shown in FIG. 7 so that a user can easily view.

The operation of folding the keyboard 1 from the usable state is explained below. Prior to folding the keyboard units U1–U3 of the keyboard 1, the connector of the PDA 37 is disconnected from the connector 21 on the bottom cover board 15 and then the PDA 37 is demounted from the upper cover 20. This state is shown in FIGS. 2A and 2B.

Thereafter, the third keyboard unit U3 is rotated leftward in FIG. 2. This state is shown in FIG. 2C. The unit U3 is further moved leftward, the keyboard 1 progressively is changed in form from the state shown in FIG. 3A and then FIG. 3B, and finally into the folded state shown in FIG. 3C.

Although the above description is made on the folding process of the keyboard 1 from the horizontally aligned state to the folded state, the unfolding process from the folded state to the horizontally aligned state can be achieved in a reverse manner to the above.

As mentioned above, the first, second, and third keyboard units U1–U3 are connected rotatably with one another through the main links 4 and 5 disposed on opposing sides of each unit. Accordingly, the second and third units U2 and U3 can simultaneously be rotated leftward with respect to the first unit U1. The first, second, and third units U1–U3 can therefore be folded by a simple one-touch operation of only rotating the third unit U3 (i.e., only moving the third unit U3 so as to be disposed above the first unit U1).

Furthermore, the first and second keyboard units U1 and U2 are connected rotatably with each other through the auxiliary link 6 constituting a parallel link to the main link 4, and the second and third keyboard units U2 and U3 are connected rotatably with each other through the auxiliary link 7 constituting a parallel link to the main link 4. Thus, while the second and third units U2 and U3 are being rotated with respect to the first unit U1, both the second and third units U2 and U3 can be held in a horizontal posture parallel to the first unit U1. It is therefore possible to stably conduct the rotating operation of the second and third units U2 and U3.

In the present embodiment, four recesses 38 are formed in the peripheral wall member 12 of the first keyboard unit U1. When the first, second, and third keyboard units U1–U3 are folded into the state shown in FIG. 3C, the projections 36 formed on the under surface of the second unit U2 are received in the recesses 38 as shown in FIG. 4.

Thus, when the first, second, and third units U1–U3 are folded, the second unit U2 can be positioned directly with respect to the first unit U1 fixedly disposed and also the third unit U3 can be positioned indirectly in conjunction with the second unit U2. Consequently, the thickness of the entire keyboard 1 in the folded state can be maintained constant, so that the upper cover 20 can easily be closed after the keyboard 1 is housed in the keyboard case 14, thus improving its portability.

It is to be noted that the present invention may be embodied in other specific forms without departing from the essential characteristics thereof.

What is claimed is:

1. A foldable keyboard comprising:
   first, second, and third keyboard units which are connected with one another, the first, second, and third keyboard units being horizontally aligned in this order during use of the keyboard and stacked one above another during non-use; and
   a main link connecting the first, second, and third keyboard units on a side end surface of each keyboard unit, one end of the main link being rotatably connected with the first keyboard unit on a side end surface thereof, a midpoint of the main link being rotatably connected with the second keyboard unit on a side end surface thereof, and the other end of the main link being rotatably connected with the third keyboard unit on a side end surface thereof.

2. The foldable keyboard according to claim 1, further comprising:
   a first auxiliary link which has a length one-half that of the main link and constitutes a parallel link to the main link, one end of the first auxiliary link being rotatably connected with the first keyboard unit and the other end of the first auxiliary link being rotatably connected with the second keyboard unit; and
   a second auxiliary link which has a length one-half that of the main link and constitutes a parallel link to the main link, one end of the second auxiliary link being rotatably connected with the second keyboard unit and the other end of the second auxiliary link being rotatable connected with the third keyboard unit.

3. The foldable keyboard according to claim 2, wherein the one end of the main link is rotatably supported on the side end surface of the first keyboard unit by a first connector and the other end of the main link is rotatably supported on the side end surface of the third keyboard unit through a second connector, wherein the first auxiliary link is formed with a first guide recess for guiding the first connector therein when the first, second, and third keyboard units are stacked one above another during non-use, and wherein the second auxiliary link is formed with a second guide recess for guiding the second connector therein when the first, second, and third keyboard units are stacked one above another during non-use.

4. The foldable keyboard according to claim 1, wherein a recess is formed in an upper surface of the first keyboard unit, and wherein the second keyboard unit includes a projection formed on an undersurface thereof, such that the projection of the second keyboard unit is received in the recess of the first keyboard unit when the folding keyboard is stacked during non-use.

5. The foldable keyboard according to claim 4, therein a plurality of recesses are formed in the upper surface of the first keyboard unit, and wherein the second keyboard unit includes a plurality of projections formed on the undersurface thereof, such that each of the plurality of projections of the second keyboard unit is received in a corresponding recess of the first keyboard unit when the folding keyboard is stacked during non-use.

6. The folding keyboard according to claim 4, further comprising:

a base cover board disposed under the first keyboard unit and having a predetermined thickness, and wherein the projection of the second keyboard unit has a thickness equal to the predetermined thickness of the base cover board, whereby the projection of the second keyboard unit supports the second keyboard unit in a horizontally flush state with the first keyboard unit during use of the folding keyboard.

7. The folding keyboard according to claim 5, further comprising:

a base cover board disposed under the first keyboard unit and having a predetermined thickness; and wherein each of the plurality of projections of the second keyboard unit has a thickness equal to the predetermined thickness of the base cover board, whereby the plurality of projections of the second keyboard unit supports the second keyboard unit in a horizontally flush state with the first keyboard unit during use of the folding keyboard.

8. The foldable keyboard according to claim 6, wherein the third keyboard unit has a projection formed on an undersurface thereof, the projection of the third keyboard unit having a thickness equal to the predetermined thickness of the base cover board and the projection of the second keyboard unit, whereby the projection of the third keyboard unit supports the third keyboard unit in a horizontally flush state with the first and second keyboard units during use of the folding keyboard.

9. The folding keyboard according to claim 7, wherein the third keyboard unit has a plurality of projections formed on an undersurface thereof, each of the plurality of projections having a thickness equal to the predetermined thickness of the base cover board and the plurality of projections of the second keyboard unit, whereby the plurality of projections of the third keyboard unit support the third keyboard unit in a horizontally flush state with the first and second keyboard units during use of the folding keyboard.

10. The folding keyboard according to claim 1, wherein the main link is hollow, providing a conduit for receiving wires extending between the first, second, and third keyboard units.

11. The folding keyboard according to claim 1, further comprising a second main link connecting the first, second, and third keyboard units on a side end surface of each of the keyboard units opposite the first main link, one end of the second main link being rotatably connected with the first keyboard unit, a midpoint of the second main link being rotatably connected with the second keyboard unit, and the other end of the second main link being rotatably connected with the third keyboard unit.

12. The folding keyboard according to claim 2, further comprising a second main link connecting the first, second, and third keyboard units on a side end surface of each of the keyboard units opposite the first main link, one end of the second main link being rotatably connected with the first keyboard unit, a midpoint of the second main link being rotatably connected with the second keyboard unit, and the other end of the second main link being rotatably connected with the third keyboard unit.

13. The folding keyboard according to claim 12, wherein the second main link is hollow, providing a conduit for receiving wires extending between the first, second, and third keyboard units.

\* \* \* \* \*